(12) United States Patent
Matsuoka et al.

(10) Patent No.: US 6,352,008 B1
(45) Date of Patent: Mar. 5, 2002

(54) ONE-PIECE FLYWHEEL HAVING OUTER RING GEAR PORTION, AND PROCESS OF MANUFACTURING THE SAME

(75) Inventors: Toshimasa Matsuoka, Nagoya; Osamu Fukuta, Sakai-gun; Saburo Fujita, Anjo, all of (JP)

(73) Assignee: Aisin Kiko Co., LTD, Kira (JP)

( * ) Notice: Subject to any disclaimer, the term of this patent is extended or adjusted under 35 U.S.C. 154(b) by 0 days.

(21) Appl. No.: 09/463,600

(22) PCT Filed: Jul. 28, 1998

(86) PCT No.: PCT/JP98/03373

§ 371 Date: Jan. 28, 2000

§ 102(e) Date: Jan. 28, 2000

(87) PCT Pub. No.: WO99/06735

PCT Pub. Date: Feb. 11, 1999

(30) Foreign Application Priority Data

Jul. 30, 1997 (JP) .............................. 9-204504

(51) Int. Cl.[7] .............................. G05G 1/00; G05G 3/00; B21D 22/00
(52) U.S. Cl. .............................. 74/572; 72/53; 72/348; 29/888.01; 29/447; 74/574
(58) Field of Search ............... 74/572–574, 72/348, 72/53; 29/888.01, 463; 464/24, 68; 192/55.1–55.61

(56) References Cited

U.S. PATENT DOCUMENTS

| 4,462,269 A | * | 7/1984 | Inglis .......................... 74/572 |
|---|---|---|---|
| 5,013,281 A | * | 5/1991 | Graton et al. .................. 464/68 |
| 5,622,245 A | | 4/1997 | Reik et al. |
| 5,634,542 A | * | 6/1997 | Grosse-Erdmann et al. ..... 192/70.27 |
| 5,732,587 A | | 3/1998 | Maeda et al. |
| 5,768,949 A | * | 6/1998 | Fujimoto et al. .............. 74/572 |
| 5,868,022 A | * | 2/1999 | Mizukami ...................... 72/53 |
| 6,137,199 A | * | 10/2000 | Lindsley ....................... 310/74 |

FOREIGN PATENT DOCUMENTS

| DE | 41 11 233 A 1 | | 10/1992 | |
|---|---|---|---|---|
| DE | 44 03 306 A 1 | | 8/1995 | |
| DE | 19705785 A1 | * | 9/1998 | .................. 74/572 |
| GB | 2061449 A | * | 5/1981 | .................. 74/572 |
| GB | 2 193 789 A | | 2/1988 | |
| JP | 60-162726 | * | 8/1985 | .................. 74/572 |
| JP | 2000-33454 | * | 2/2000 | .................. 74/572 |

* cited by examiner

Primary Examiner—Vinh T. Luong
(74) Attorney, Agent, or Firm—Oliff & Berridge, PLC

(57) ABSTRACT

A generally disc-shaped flywheel which is an integral one-piece forged structure formed by forging of a carbon steel blank and consisting of an inner portion having a friction surface and an outer ring gear portion disposed radially outwardly of the inner portion. The flywheel is formed by forging the carbon steel blank to obtain an intermediate product consisting of the inner portion and the outer ring gear portion, hardening the friction surface of the inner portion of the intermediate product, and shot peening the hardened friction surface to form a multiplicity of recesses in the hardened friction surface.

13 Claims, 4 Drawing Sheets

ONE-PIECE FLYWHEEL HAVING OUTER RING GEAR PORTION, AND PROCESS OF MANUFACTURING THE SAME

TECHNICAL FIELD

The present invention relates in general to a flywheel, and more particularly to improvements of a flywheel having an outer ring gear portion.

BACKGROUND ART

An engine such as an internal combustion engine operated by combustion of a fuel is widely used as a drive power source for automobiles, for example. Such an engine inevitably suffers from a periodic variation in operating speed (angular velocity) or torque in synchronization with a combustion cycle. To reduce or minimize this variation, a flywheel is usually attached to a crankshaft which is rotated by the engine. A flywheel is also used to reduce a periodic variation in the operating speed of other rotating members not associated with an engine.

DE 44 03 306 discloses an example of a known two-piece flywheel used for automobiles, which consists of an inner body and a separate ring gear. Another type of known two-piece flywheel is manufactured by press-fitting or shrink-fitting an inner body into a separate ring gear, as indicated in FIG. 7. Generally, the ring gear is formed from a carbon steel blank (e.g., S48C blank) usually used for machine structures, by hobbing or other machining operation using a pinion cutter, for example. The ring gear has a multiplicity of teeth formed along the periphery of a ring member such that the teeth extend over the entire axial dimension of the ring member, namely, ring gear. On the other hand, the inner body has a central attaching section for attachment to a crankshaft, and is generally formed by casting of a gray iron such as FC230. The inner body is press-fitted or shrink-fitted into the opening of the ring gear to produce the flywheel. That is, the flywheel consists of the inner body member and the outer ring gear which are fixed to each other.

Where the flywheel is used with an engine, the outer ring gear of the flywheel is held in meshing engagement with a pinion of an engine starter motor, so that the crankshaft is rotated by the starter motor to start the engine.

The known flywheel the inner body of which is formed of a cast gray iron tends to suffer from insufficient tensile strength at its attaching section. In view of this drawback, the attaching section is conventionally required to have a large wall thickness in the axial direction of the flywheel. However, this solution results in an increase in the weight of the inner body member, and a decrease in the ratio of the weight of the outer ring gear to the total weight of the flywheel. Accordingly, the moment of inertia of the flywheel is reduced, leading to an undesirable increase in the amount of variation in the rotary motion of the crankshaft, and a consequent decrease in the fuel economy of the engine.

A further drawback of the known flywheel is a relatively high cost of manufacture, primarily because of the use of two blanks, which must be processed to produce the ring gear and the inner body member, respectively, before these two members are assembled together into the flywheel. Thus, there is a limitation in the reduction of the manufacturing cost of the known flywheel.

The conventional flywheel also has a problem of insufficient mechanical strength (insufficient toughness, for example) due to hardening treatment effected during the manufacture, while the flywheel is generally required to have a sufficiently high degree of durability at a high operating speed. In this respect, it is noted that the engine of a modern vintage is required to have a relatively high maximum operating speed.

DISCLOSURE OF INVENTION

It is therefore a first object of the present invention to provide a flywheel which has an increased strength at its outer ring gear portion and which is economical to manufacture.

It is a second object of this invention to provide a method of economically manufacturing a flywheel having an increased strength at its outer ring gear portion.

The first object indicated above may be achieved according to a first aspect of the present invention, which provides a flywheel which is generally disc-shaped and which includes a ring gear disposed along a periphery thereof and has a friction surface on one of axially opposite sides thereof characterized in that the flywheel is an integral one-piece forged structure which is formed by forging a carbon steel blank and which consists of an inner portion having the friction surface and an outer ring gear portion which serves as the ring gear and which is disposed radially outwardly of the inner portion.

The flywheel of the present invention constructed as described above is an integral one-piece forged structure formed by forging a carbon steel blank, for example, a blank of a carbon steel material for machine structural use. Accordingly, the tensile strength of the flywheel at the attaching section of its inner portion is significantly increased, so that the required wall thickness at the attaching section can be accordingly reduced. Therefore, the present flywheel may be designed to have an increased ratio of the weight of the outer ring gear portion to the total weight, and an accordingly increased moment of inertia.

Further, the outer ring gear portion formed by forging has a higher strength owing to a continuous metal structure, than the ring gear of the conventional flywheel, which is formed by hobbing or any other tooth cutting operation.

In addition, the present one-piece flywheel can be manufactured at a reduced cost, with a reduced number of process steps, since the integral one-piece forging structure of the flywheel is formed by forcing of the carbon steel blank, without having to prepare two separate members, that is, an inner body member and a ring gear member, and assemble these two members together, as required to manufacture the conventional flywheel.

In one preferred form of the present flywheel, the outer ring gear portion consists of a toothed section and a base section which are two mutually adjacent axial sections of the outer ring gear portion. The toothed section is formed by forging a cylindrical blank as the blank in an axial direction thereof and has a multiplicity of teeth which project in a radially outward direction of the outer ring gear portion and extend in an axial direction of the outer ring gear portion and which are spaced apart from each other in a circumferential direction of the outer ring gear portion. The teeth of the toothed section are connected to each other by the base section which is adjacent to the toothed section in the axial direction of the outer ring gear portion. In this form of the flywheel, the toothed section of the outer ring gear portion has an increased mechanical strength, in particular, increased toughness, even where the toothed section is hardened. Accordingly, the flywheel exhibits improved durability at a high operating speed.

The toothed section having the multiplicity of teeth is preferably located on the axial side of the flywheel which is remote from the friction surface provided on the inner portion.

In another preferred form of the flywheel of the present invention, the friction surface has a multiplicity of minute recesses or micro holes formed by shot peening after the forging on the carbon steel blank. In operation of the flywheel, the friction surface is brought into frictional contact with a friction member such as a clutch disc. In the presence of the minute recesses formed in the friction surface of the flywheel, there remains a network or matrix of air between the friction surface and the friction member, which makes it possible to minimize an increase of the friction coefficient of the friction surface even at a relatively high operating temperature, thereby reducing the amount of wear of the friction surface and prolonging the expected service life of the friction surface. In this respect, it is noted that the frictional sliding contact of the friction surface and the friction member causes a rise of the temperature at the friction surface. In the conventional flywheel including the inner body member formed of a cast iron, a graphite contained in the cast iron is melted and functions as a lubricant which reduces a rise of the friction coefficient at the high temperature, thereby reducing the amount of wear of the friction surface. In the present flywheel formed of a carbon steel material, the friction surface the temperature of which tends to rise, is desirably subjected to shot peening to form a matrix of minute recesses, which is effective to prevent an excessive rise of the temperature at the friction surface and an excessive increase of the friction coefficient of the friction surface.

It is noted that an excessive rise of the friction coefficient of the friction surface of the flywheel may cause a quick engagement of the friction member with the friction member such as a clutch disc. In this case, the flywheel when used for an engine of an automobile may suffer from the following problems:

a) The clutch of the vehicle cannot be smoothly operated, leading to easy stall of the engine.
  b) The power transmission system of the vehicle may be subject to an abrupt change in the load torque acting thereon, leading to reduced service life of the power transmission system.
  c) The engine of the vehicle is likely to suffer from a juddering phenomenon at a relatively low operating speed.
  d) The clutch disc suffers from an excessive wear, leading to reduced service life thereof.

According to a further preferred form of the flywheel of this invention, the friction surface is hardened prior to the shot peening. For instance, the friction surface is hardened to within a range of about HRC45–47. The hardening of the friction surface is effective to reduce the rate of wearing of the friction surface. The wearing of the friction surface causes an increase in the smoothness (i.e., a decrease in the roughness) of the friction surface, even where the friction surface is initially given the minute recesses. In other words, the hardening of the friction surface maintains the minute recesses in their original shape and size for a prolonged period of time, and thereby maintains a sufficient amount of air between the friction surface and the friction member, to thereby hold the friction coefficient therebetween at a value low enough to prevent an excessive rise of the temperature, which would cause thermal decomposition of the material of the clutch disc. Therefore, the hardening of the friction surface permits the present carbon steel flywheel to have operating durability and service life which are comparable with those of the conventional gray cast iron flywheel.

The second object indicated above may be achieved according to a second aspect of this invention, which provides a process of manufacturing a flywheel which is generally disc-shaped and which includes a ring gear disposed along a periphery thereof and has a friction surface on one of axially opposite sides thereof, characterized by comprising the steps of: (a) forging a carbon steel blank to obtain an intermediate product which is a generally disc-shaped integral one-piece forged structure consisting of an inner portion having the friction surface and an outer ring gear portion which serves as the ring gear and which is disposed radially outwardly of the inner portion; (b) hardening the friction surface of the inner portion of the intermediate product; and (c) shot peening the hardened friction surface to form a multiplicity of minute recesses in the hardened friction surface.

The process of the present invention has the same advantages as described above with respect to the flywheel of the invention, and the advantages described above with respect to the minute recesses formed in the friction surface and the hardening of the friction surface.

The principle of the present invention is particularly applicable to a flywheel which is coaxially connected to the crankshaft of an engine of a motor vehicle and which is a generally disc-shaped member having an outer ring gear portion. However, the principle of the invention is equally applicable to any other rotating member. Where the flywheel is used with the engine crankshaft, a pinion driven by an engine starter motor meshes with the outer ring gear portion of the flywheel.

According to one preferred form of the present process, the step of forging a carbon steel blank to obtain an intermediate product comprises: hot-forging a cylindrical carbon steel blank to obtain a first cylindrical intermediate product having an inner disc portion and an outer annular portion which are integral with each other; and cold-forging the first cylindrical intermediate product to form the outer ring gear portion at the outer annular portion, for thereby obtaining a second cylindrical intermediate product as the generally disc-shaped integral one-piece forged structure consisting of the inner portion and the outer ring gear portion.

However, the generally disc-shaped integral one-piece forged structure of the flywheel may be obtained in a single forging step.

In one arrangement of the above preferred form of the present process, the step of cold-forging the first cylindrical intermediate product comprises moving the first cylindrical intermediate product relative to a gear forming die in an axial direction of the first cylindrical intermediate product, the gear forming die having a multiplicity of tooth forming teeth for forming a multiplicity of teeth of the outer ring gear portion.

The process according to another preferred form of this invention further comprises the step of hardening a surface of the outer ring gear portion. The process may further comprise the step of cutting a plurality of holes through the attaching section of the inner portion, which holes are used for attaching the flywheel to the crankshaft or other rotary member.

The shot peening of the friction surface may be effected with steel particles driven by a blast of compressed air or by a centrifugal force against the friction surface, at a velocity of about 100 m/sec, for example. The steel particles have a diameter or size selected within a range of 40–200 μm and a hardness not lower than that of the carbon steel material of the flywheel (blank). The minute recesses or micro holes formed in the hardened friction surface preferably have a depth of several microns. The shot peening is preferably adapted to give the friction surface a hardened layer having a thickness of about 10–20 μm, which is larger than the depth of the minute recesses. The hardness of the hardened layer is higher than the hardness given by the hardening operation such as induction hardening. The shot peening may be referred to as "wide peening cleaning (WPC)".

The step of hardening the friction surface is preferably effected by induction hardening such as hardening by high-frequency induction heating, prior to the shot peening of the friction surface. The friction surface may be hardened to HRC45–47.

BRIEF DESCRIPTION OF DRAWINGS

The above and optional objects, features, advantages and technical and industrial significance of this invention will be better understood by reading the following detailed description of the invention, when considered in connection with the accompanying drawings, in which.

BEST MODE FOR CARRYING OUT THE INVENTION

Figure 1:
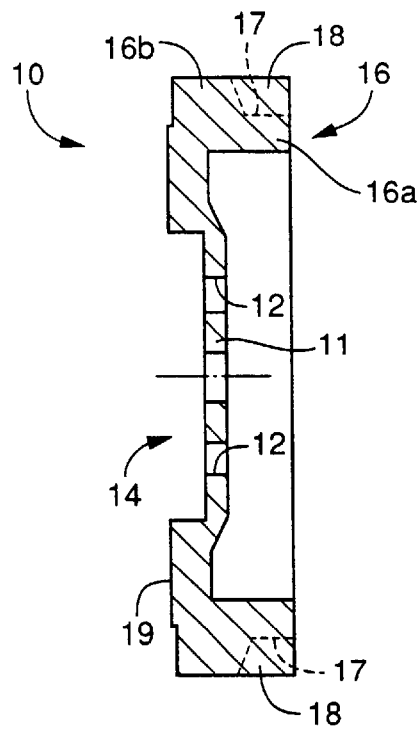
FIG. 1 is a side elevational view in cross section of a flywheel for an automobile constructed according to one embodiment of the present invention, taken along line 1—1 of FIG. 2.
Figure 2:
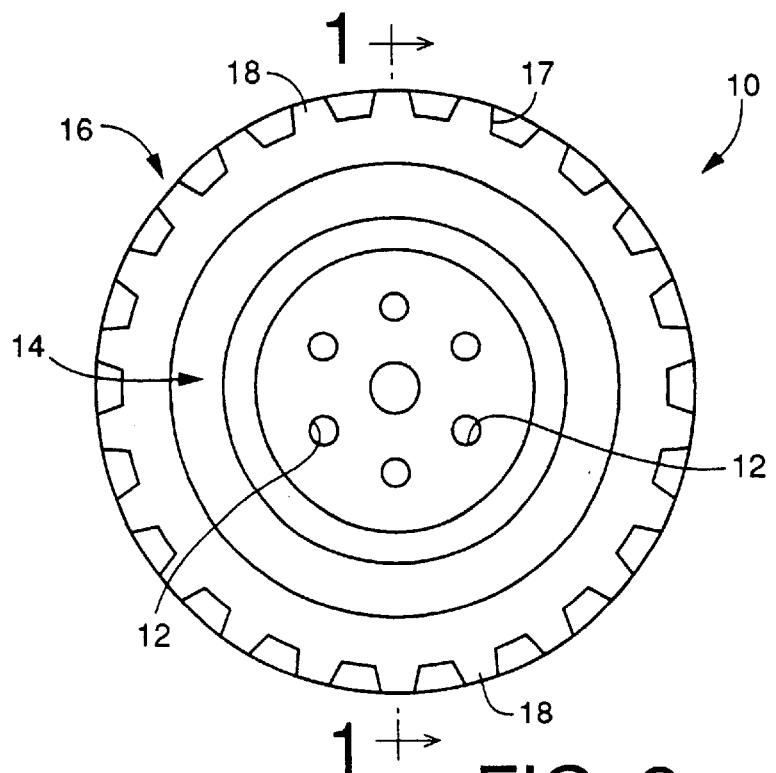
FIG. 2 is a front elevational view of the flywheel of FIG. 1.

Referring first to FIGS. 1 and 2, there is shown a flywheel 10 constructed according to one embodiment of this invention. The flywheel 10 is used with a crankshaft of an internal combustion engine of an automotive vehicle. The flywheel 10 is a generally disc-shaped structure consisting of a cylindrical inner portion 14 and an annular outer ring gear portion 16 disposed radially outwardly of the inner portion 14. The inner portion includes a central attaching section 11 which has six holes 12 formed therethrough. The flywheel 10 is attached at its attaching section 12 to the crankshaft of the engine, with bolts being inserted through the holes 12, such that the flywheel 10 is coaxial with the crankshaft.

As shown in FIG. 1, the central attaching section 11 of the inner portion 14 has a comparatively small wall thickness or axial dimension, while the outer ring gear portion 16 has a comparatively large wall thickness or axial dimension. The outer ring gear portion 16 located radially outwardly of the inner portion 14 is an annular portion extending from the inner portion 14 in the axial direction. The outer ring gear portion 16 consists of a toothed section 16a and a base section 16b which are two mutually adjacent axial half sections, two substantially equal sections which are mutually adjacent to each other in the axial direction of the flywheel 10. The toothed section 16a, which is located on the right-hand side as seen in FIG. 1, has a multiplicity of grooves 17 which are evenly spaced apart from each other in the circumferential direction of the annular outer ring gear portion 16, as shown in FIG. 2. The grooves 17 are open in the outer circumferential surface of the toothed section 16a and in the annular end face of the toothed section 16a remote from the base section 16b, as shown in FIGS. 1 and 2. In the presence of the multiple grooves 17, the toothed section 16a has a multiplicity of teeth 18 which project in the radially outward direction of the flywheel 10, as shown in FIG. 2, and extend in the axial direction of the flywheel 10. The teeth 18 are spaced apart from each other in the circumferential direction of the outer ring gear portion 16, as shown in FIG. 2. The teeth 18 are connected to each other by the base portion 16b adjacent to the toothed section 16a, as well as by the radially inner circumferential part of the toothed section 16a.

Since the outer ring gear portion 16 has a sufficiently large wall thickness or axial dimension, the flywheel 10 has a sufficiently high ratio of the weight of the outer ring gear portion 16 to the total weight of the flywheel 10, and therefore has a sufficiently large momment of inertia, without increasing the diameter of the flywheel 10.

The inner portion 14 has an annular friction surface 19 slightly projecting in the axial direction opposite to the direction in which the annular outer ring gear portion 16 extends. Namely, the friction surface 19 is provided on one of the opposite surfaces of the inner portion 14, which is remote from the toothed section 16a of the outer ring gear portion 16. The friction surface 19 is provided for frictional contact with a clutch disc under pressure. The friction surface 19 lies in a plane perpendicular to the axis of rotation of the flywheel 10.

Figure 3:
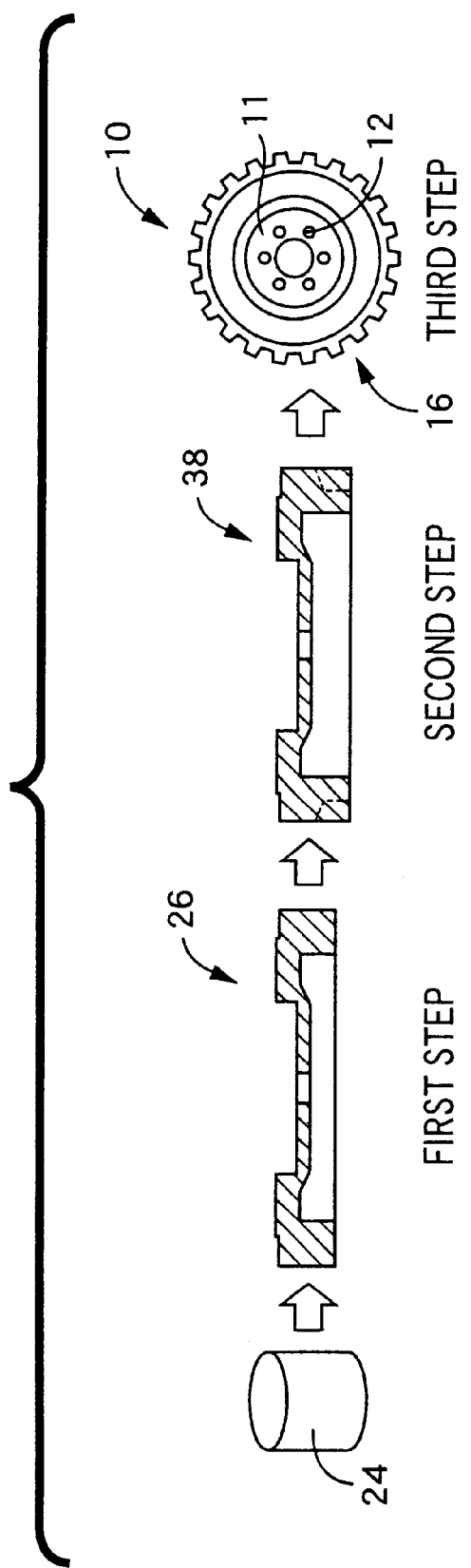
FIG. 3 is a schematic view illustrating a flow of two process steps for manufacturing the flywheel of FIG. 1.
Figure 4:
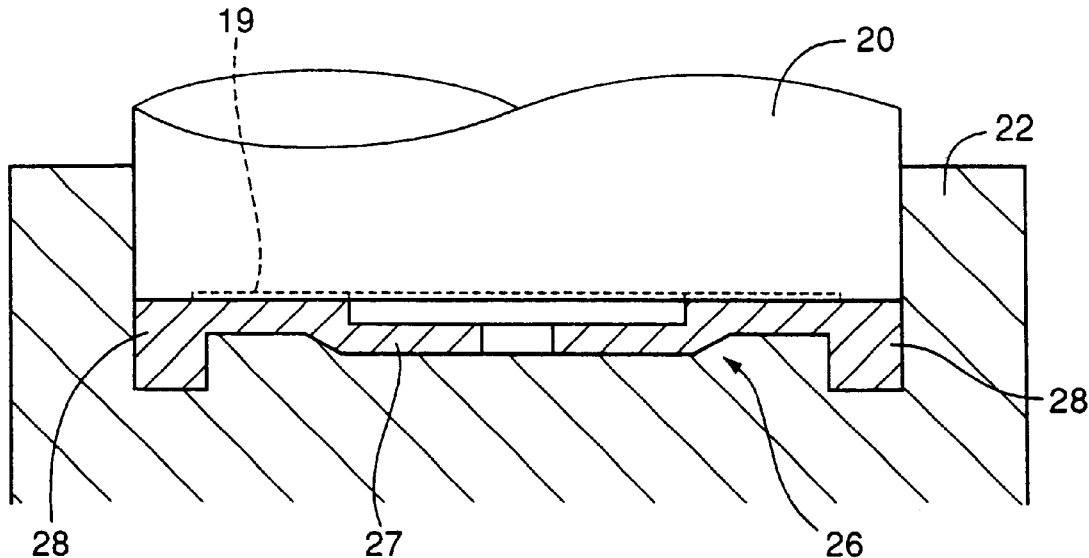
FIG. 4 is a view indicating a first forging step in the process of FIG. 3.

The flywheel 10 is manufactured in three major process steps, as indicated in FIG. 3. In the first step, a carbon steel blank 24 of cylindrical shape, i.e. a cylindrical blank, of a carbon steel material for machine structural use, for instance, carbon steel S35C (JIS), is hot-forged into a first cylindrical intermediate product 26, between an upper die 20 and a lower die 22, as shown in FIG. 4. The upper die 20 has a forming surface substantially following the shape of the left-hand side surface (as seen in FIG. 1) of the flywheel 10, which surface includes the friction surface 19. On the other hand, the lower die 20 has a forming surface substantially following the shape of the right-hand side surface of the flywheel 10. With the carbon steel blank 24 placed in the lower die 22, the upper and lower dies 20, 22 are moved toward each other, whereby the blank 24 is formed into the first cylindrical intermediate product 28 which has an inner disc portion 27 corresponding to the inner portion 14 of the flywheel 10, and an annular portion 28 which is radially outward of and integral with the inner disc portion 27. The first cylindrical intermediate product 28 is almost similar in shape to the flywheel 10, but does not have the teeth 18. That is, the toothed section 16a has not been formed on the annular portion 28 of the first intermediate product 28. The annular portion 28 has an outside diameter substantially equal to that of the flywheel 10 (outer ring gear portion 16), and an axial dimension which is slightly smaller than that of the outer ring gear portion 16 of the flywheel 10 to be manufactured.

Figure 5:
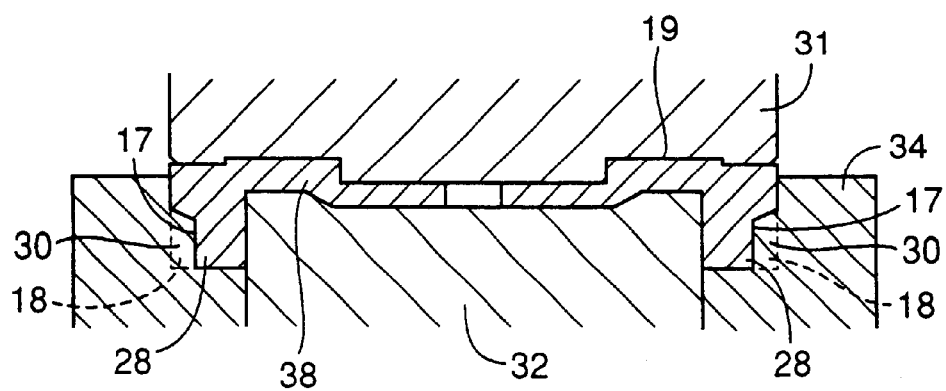
FIG. 5 is a view indicating a second forging step in the process of FIG. 3.

In the second step, the first cylindrical intermediate product 26 is cold-forged using an upper die 31, a lower die 32, and a gear forming die 34, as shown in FIG. 5. The upper and lower dies 31, 32 cooperate to define a cavity substantially following the shape of the first cylindrical intermediate product 26. The gear forming die 34 has a multiplicity of tooth forming teeth 30 which are spaced apart from each other at the same pitch as the grooves 17 of the toothed section 16*a* and each of which has a shape substantially identical with the grooves 17. With the first intermediate product 26 held between the upper and lower dies 31, 32, the first intermediate product 26 and the gear forming die 34 are moved toward each other in the axial direction of the product 26, so that the grooves 17 are formed by flows of the material of the product 26 by the respective tooth forming teeth 30 of the gear forming die 34, whereby the multiplicity of teeth 18 are formed. The material of the first intermediate product 2 which has been moved by the tooth forming teeth 30 to form the grooves 17 is forced to flow toward the end of the annular portion 28. Thus, the first cylindrical intermediate product 26 is cold-forged into a second cylindrical intermediate product 38 which includes the outer ring gear portion 16 having the desired axial dimension. In other words, the axial dimension of the annular portion 28 is increased to the nominal value of the outer ring gear portion 16, by cold-forging the first cylindrical intermediate product 26.

Figure 6A:
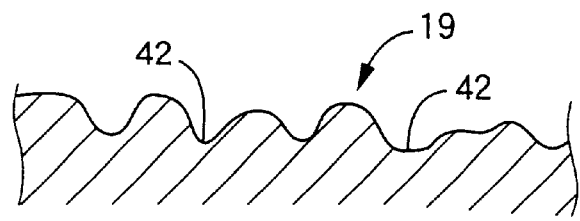
FIG. 6(a) is a view showing micro holes formed by shot peening in the friction surface of the flywheel of FIG. 1.
Figure 6B:
FIG. 6(b) is a view showing a friction surface of the conventional flywheel formed by casting of a gray iron.
Figure 7:
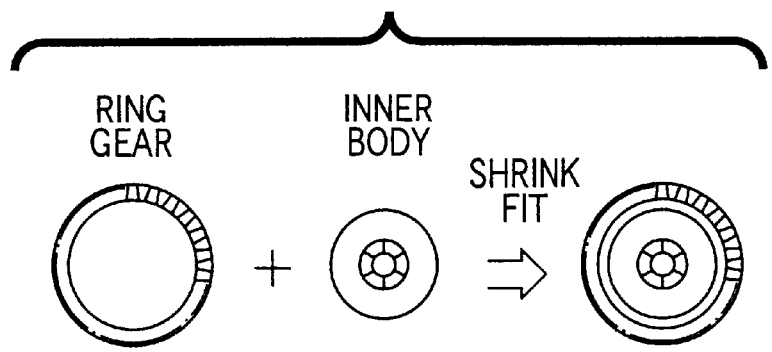
FIG. 7 is a view for explaining a process of manufacturing a conventional flywheel.

In the third step, the second cylindrical intermediate product 28 is subjected to a drilling operation to form the six holes 12 through the central portion of the intermediate product 28, and an induction hardening operation to harden the surface of the outer ring gear portion 16. The second intermediate product 28 is further subjected to an induction hardening operation to harden the friction surface 19 to a hardness value within a range of about HRC45–47, so that the durability of the friction surface 19 is improved.. Then, the hardened friction surface 19 is subjected to a shot peening operation using steel particles driven by a blast of compressed air or by a centrifugal force against the friction surface 19, at a velocity of about 100 m/sec. The steel particles have a diameter or size selected within a range of 40–200 μm. As a result, a multiplicity of micro holes or minute recesses 42 are formed in the hardened friction surface 19, as illustrated in an enlarged view of FIG. 6(*a*). The micro holes 42 have a depth of about several microns. The shot peening gives the initially hardened friction surface 19 a hardened layer having a thickness of about 20 μm, which is considerably larger than the depth of the micro holes 42. The hardened layer has a hardness of about HRC70–90. FIG. 6(*b*) illustrates a friction surface of the conventional flywheel of a gray cast iron.

The flywheel 10 according to the present embodiment constructed as described above is an integral one-piece forged structure formed by forging the carbon steel blank 24 for machine structural use. Accordingly, the tensile strength of the flywheel 10 at the attaching section 11 of its inner portion 14 is significantly increased, so that the required wall thickness at the attaching section 11 can be accordingly reduced. Therefore, the present flywheel 10 may be designed to have an increased ratio of the weight of the outer ring gear portion 16 to the total weight, and an accordingly increased moment of inertia. Accordingly, the amount of variation of the operating speed of the crankshaft is reduced, and the fuel economy of the engine is improved.

Further, the outer ring gear portion 16 formed by forging has a higher strength owing to a continuous metal structure, than the ring gear of the conventional flywheel, which is formed by hobbing or any other tooth cutting operation. In addition, the present one-piece flywheel 10 can be manufactured at a reduced cost, with a reduced number of process steps, since the integral one-piece forging structure of the flywheel 10 is formed by forcing of the carbon steel blank 24, without having to prepare two separate members, that is, an inner body member and a ring gear member, and assemble these two members together, as required to manufacture the conventional flywheel.

The outer ring gear portion 16 consists of the toothed section 16*a* and the base section 16*b* which are two mutually adjacent axial half sections of the outer ring gear portion. Since the teeth 18 of the toothed section 16*a* are connected to each other by the base section 16*b* which is adjacent to the toothed section 16*a* in the axial direction of the outer ring gear portion 16, the toothed section 16*a* has an increased mechanical strength, in particular, increased toughness, even where the toothed section 16*a* is hardened. Accordingly, the flywheel 10 exhibits improved durability at a high operating speed.

The present flywheel 10 has a further advantage which is derived from the multiplicity of micro holes 42 formed in the friction surface 19 by shot peening. In operation of the flywheel 10, the friction surface 19 is brought into frictional contact with a friction member such as a clutch disc. In the presence of the micro holes 42 formed in the friction surface 19 of the flywheel 10, there remains a network or matrix of air between the friction surface 19 and the friction member, which makes it possible to minimize an increase of the friction coefficient of the friction surface 19 even at a relatively high operating temperature, thereby reducing by the amount of wear of the friction surface 19 and prolonging the expected service life of the friction surface 19. In this respect, it is noted that the frictional sliding contact of the friction surface 19 and the friction member causes a rise of the temperature at the friction surface 19. In the conventional flywheel including the inner body member formed of a cast iron, a graphite contained in the cast iron is melted and functions as a lubricant which reduces a rise of the friction coefficient at the high temperature, thereby reducing the amount of wear of the friction surface. In the present flywheel 10 formed of a carbon steel material, the friction surface 19 the temperature of which tends to rise is subjected to shot peening to form a matrix of micro holes 42, which is effective to prevent an excessive rise of the temperature at the friction surface 19 and an excessive increase of the friction coefficient of the friction surface 19.

Further, the hardening of the friction surface 19 is effective to reduce the rate of wearing of the friction surface 19. The wearing of the friction surface 19 causes an increase in the smoothness (i.e., a decrease in the roughness) of the friction surface 19, even where the friction surface is initially given the micro holes 42. In other words, the hardening of the friction surface 19 maintains the micro holes 42 in their original shape and size for a prolonged period of time, and thereby maintains a sufficient amount of air between the friction surface 19 and the friction member, to thereby hold the friction coefficient therebetween at a value low enough to prevent an excessive rise of the temperature, which would cause thermal decomposition of the material of the clutch disc. Therefore, the hardening of the friction surface permits 19 the present carbon steel flywheel to have operating durability and service life which are comparable with those of the conventional flywheel formed of a gray cast iron.

While the presently preferred embodiment of this invention has been described above in detail with a certain degree of particularity, by reference to the accompanying drawings, it is to be understood that the present invention is not limited to the details of the illustrated embodiment, but may be otherwise embodied.

For instance, the friction surface 19 need not be subjected to an induction hardening operation, and may be subjected to a shot peening operation without prior induction hardening.

While the friction surface 19 is hardened by high-frequency induction heating, it may be hardened by any other hardening treatment.

It is to be understood that the present invention may be embodied with various other changes, modifications and improvements, which may occur to those skilled in the art, without departing from the spirit and scope of the invention defined in the following claims.

What is claimed is:

1. A flywheel which is disc-shaped for engaging a friction member, said flywheel including a ring gear disposed along a periphery thereof and having a friction surface of axially opposite sides thereof, for frictional contact with said friction member wherein an improvement comprises:

said flywheel being an integral one-piece forged structure which is formed by forging a carbon steel blank and which consists of an inner portion having said friction surface and an outer ring gear portion which serves as said ring gear and which is disposed radially outwardly of said inner portion; and said friction surface having a multiplicity of minute recesses formed by shot peening after said forging on said carbon steel blank.

2. A flywheel according t o claim 1, wherein said carbon steel blank is a cylindrical blank and said outer ring gear portion comprises a toothed section and a base section which are two mutually adjacent axial sections of said outer ring gear portion, said toothed section being formed by forging said cylindrical blank in an axial direction thereof, said toothed section having a multiplicity of teeth which project in a radial outward direction of said outer ring gear portion and extend in an axial direction of said outer ring gear portion and which are spaced apart from each other in a circumferential direction of said outer ring gear portion, said multiplicity of teeth being connected to each other by said base section.

3. A flywheel according to claim 2, wherein said toothed section having said multiplicity of teeth is located on the other of said axially opposite sides of said flywheel, which is remote from said friction surface.

4. A flywheel according to claim 1, wherein said friction surface is hardened prior to said shot peening.

5. A flywheel according to claim 1, wherein said said carbon steel blank is formed of a carbon steel material for machine structural use.

6. A process of manufacturing a flywheel which is disc-shaped and which includes a ring gear disposed along a periphery thereof and has a friction surface on one of axially opposite sides thereof, comprising the steps of:

forging a carbon steel blank to obtain an intermediate product which is a disc-shaped integral one-piece forged structure comprising additional an inner portion having said friction surface and an outer ring gear portion which serves as said ring gear and which is disposed radially outwardly of said inner portion;

hardening said friction surface of said inner portion of said intermediate product; and shot peening the hardened friction surface to form a multiplicity of minute recesses in said hardened friction surface.

7. A process according to claim 6, wherein said step of forging a carbon steel blank to obtain an intermediate product comprises:

hot-forging a cylindrical carbon steel blank to obtain a first cylindrical intermediate product having an inner disc portion and an outer annular portion which are integral with each other; and cold-forging said first cylindrical intermediate product to form said outer ring gear portion at said outer annular portion, for thereby obtaining a second cylindrical intermediate product as said disc-shaped integral one-piece forged structure consisting of said inner portion and said outer ring gear portion.

8. A process according to claim 7, wherein said step of cold-forging said first cylindrical intermediate product comprises moving said first cylindrical intermediate product relative to a gear forming die in an axial direction of said first cylindrical intermediate product, said gear forming die having a multiplicity of tooth forming teeth for forming a multiplicity of teeth of said outer ring gear portion.

9. A process according to claim 6, further comprising the step of hardening a surface of said outer ring gear portion.

10. A process according to claim 6, wherein said carbon steel blank is formed of a carbon steel material for machine structural use.

11. A flywheel which is disc-shaped and which includes an inner portion having a friction surface on one of axially opposite sides thereof, and a ring gear disposed radially outwardly of said inner portion, wherein said friction surface has a multiplicity of minute recesses formed by shot peening.

12. A flywheel according to claim 11, which is an integral one-piece forged structure which is formed by forging a carbon steel blank and which consists of said inner portion having said friction surface and an outer ring gear portion which serves as said ring gear.

13. A flywheel according to claim 11, wherein said multiplicity of minute recesses are formed by shot peening after said friction surface is hardened.

* * * * *